US012688096B2

(12) United States Patent
Jeong et al.

(10) Patent No.: US 12,688,096 B2
(45) Date of Patent: Jul. 21, 2026

(54) CHECKPOINT AND REWIND METHOD AND APPARATUS IN SERVERLESS PLATFORM

(71) Applicants: UIF (University Industry Foundation), Yonsei University, Seoul (KR); RESEARCH & BUSINESS FOUNDATION SUNGKYUNKWAN UNIVERSITY, Suwon-si (KR)

(72) Inventors: Jinkyu Jeong, Seoul (KR); Jaehyun Song, Seoul (KR); Bumsuk Kim, Suwon-si (KR); Euiseong Seo, Suwon-si (KR)

(73) Assignees: UIF (University Industry Foundation), Yonsei University, Seoul (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 18/974,346

(22) Filed: Dec. 9, 2024

(65) Prior Publication Data

US 2025/0363010 A1     Nov. 27, 2025

(30) Foreign Application Priority Data

May 21, 2024     (KR) ......................... 10-2024-0065783

(51) Int. Cl.
*G06F 11/1446* (2026.01)
(52) U.S. Cl.
CPC ............................... *G06F 11/1451* (2013.01)
(58) Field of Classification Search
CPC .................................................. G06F 11/1451
See application file for complete search history.

(56) References Cited

U.S. PATENT DOCUMENTS

| | | | | |
|---|---|---|---|---|
| 11,144,359 | B1 * | 10/2021 | Brooker ................... | G06F 21/53 |
| 11,507,538 | B1 * | 11/2022 | Gaul ...................... | G06F 16/173 |
| 2010/0205363 | A1 * | 8/2010 | Hwang ................ | G11C 29/883 |
| | | | | 711/170 |
| 2017/0372073 | A1 * | 12/2017 | Gunti .................... | G06F 21/575 |
| 2019/0018790 | A1 * | 1/2019 | Beard ................. | G06F 12/1081 |
| 2021/0049070 | A1 | 2/2021 | Gustafsson | |

FOREIGN PATENT DOCUMENTS

KR     10-2021-0076882 A     6/2021

OTHER PUBLICATIONS

Anonymous Author(s), "A Secure and Fast Serverless Platform with Function REWIND", pp. 1-14.
Rodrigo Landa Andraca et al., "Limitless FaaS: Overcoming serverless functions execution time limits with invoke driven architecture and memory checkpoints", May 21, 2024.

* cited by examiner

*Primary Examiner* — Tony Wu
(74) *Attorney, Agent, or Firm* — ZION IP; Byungwoong Park

(57)     ABSTRACT

Disclosed is a checkpoint and rewind method in a serverless platform. The checkpoint and rewind method in a serverless platform performed by at least one processor includes receiving a function execution request on the serverless platform, storing an initial state of a sandbox by performing a checkpoint operation on the sandbox associated with the function execution request, and restoring a state of the sandbox to the stored initial state by performing a rewind operation on the sandbox after a task corresponding to the function execution request is completed.

15 Claims, 8 Drawing Sheets

| Anon VMA | Page Table Entry | |
|---|---|---|
| | Writable | PFN |
| | | |
| | | |
| | | |
| | | |
| | | |
| | | |
| | | |
| X | 0 | 0x002 |
| X | 1 | 0x001 |

Buddy page table 214

Original page table 212

210

| Anon VMA | Page Table Entry | |
|---|---|---|
| | Writable | PFN |
| | | |
| | | |
| X | 0 | 0x002 |
| X | 0 | 0x001 |
| | | |
| | | |
| X | 0 | 0x002 |
| X | 0 | 0x001 |

Figure 3:
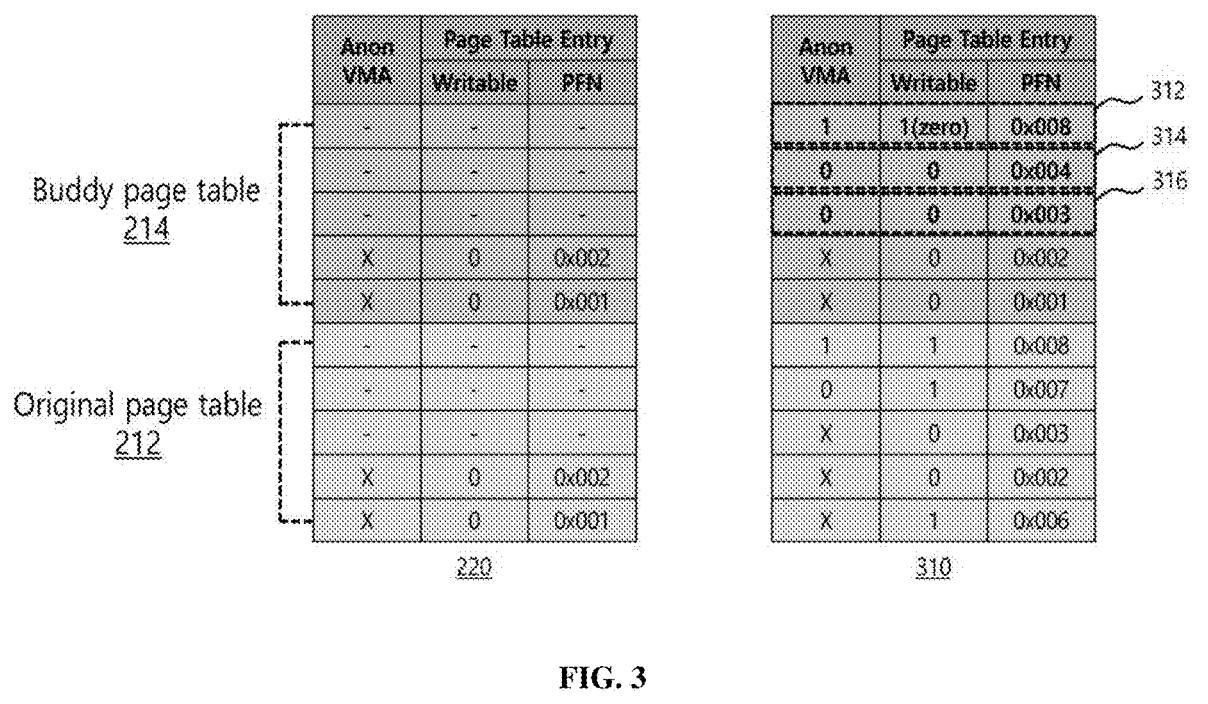

Buddy page table 214

Original page table 212

| Anon VMA | Page Table Entry | |
| --- | --- | --- |
| | Writable | PFN |
| . | . | . |
| . | . | . |
| . | . | . |
| x | 0 | 0x002 |
| x | 0 | 0x001 |
| . | . | . |
| . | . | . |
| x | 0 | 0x002 |
| x | 0 | 0x001 |

220

| Anon VMA | Page Table Entry | |
| --- | --- | --- |
| | Writable | PFN |
| 1 | 1(zero) | 0x008 |
| 0 | 0 | 0x004 |
| 0 | 0 | 0x003 |
| x | 0 | 0x002 |
| x | 0 | 0x001 |
| 1 | 1 | 0x008 |
| 0 | 1 | 0x007 |
| x | 0 | 0x003 |
| x | 0 | 0x002 |
| x | 1 | 0x006 |

CHECKPOINT AND REWIND METHOD AND APPARATUS IN SERVERLESS PLATFORM

CROSS-REFERENCE TO RELATED APPLICATIONS

This application claims priority under 35 U.S.C. § 119 to Korean Patent Application No. 10-2024-0065783, filed in the Korean Intellectual Property Office on May 21, 2024, the entire contents of which are hereby incorporated by reference.

STATEMENT REGARDING GOVERNMENT SPONSORED RESEARCH OR DEVELOPMENT

The present disclosure is derived from research conducted as part of SW computing industry source technology development (Project unique No.: 1711193333, Project No.: 2021-0-00773-003, Project management agency: Information and Communication Planning and Evaluation Institute, Research project name: Edge-friendly operating system for edge micro data center, Project performing agency name: Sungkyunkwan University Industry-Academic Cooperation Foundation, Research period: 2023.01.01~2023.12.31) of Ministry of Science and ICT.

Moreover, the present disclosure is derived from research conducted as part of the ultra-high performance computing SW ecosystem development (Project Unique No.: 1711201093, Project No.: 00321688, Project Management Agency: National Research Foundation of Korea, Research Project Name: Development of Korea Exascale Application SW Development Environment (KEASE) Framework, Project Execution Agency Name: Soongsil University Industry-Academic Cooperation Foundation, Research Period: 2023 Nov. 1~2024 Apr. 30) of Ministry of Science and ICT.

Meanwhile, in all the aspects of the inventive concept, there is no property interest in the government of the Republic of Korea.

BACKGROUND

Embodiments of the present disclosure described herein relate to a checkpoint and rewind method and apparatus in a serverless platform, and more particularly, relate to a checkpoint and rewind method and apparatus for removing data residues of a function executed in a serverless platform.

Serverless computing refers to a form of a service where peripheral application software functions required to run core functions are provided by a cloud service provider. In the serverless computing, functions associated with an application are provided to a sandbox such as a container so as to be processed. In this case, it is important to maintain isolation (i.e., statelessness) between function requests.

In general, to maintain the statelessness, sandbox initialization is performed before the next function is processed after the previous function is executed. However, when the sandbox initialization is performed, the processing speed of the application may be significantly reduced. To solve these issues, a warm sandbox technology for reusing the sandbox without initializing the present sandbox is currently being used. However, the warm sandbox technology may not guarantee complete isolation between function requests, and thus private data created or used when a function executed may be leaked.

SUMMARY

Embodiments of the present disclosure provide a checkpoint and rewind method in a serverless platform, a computer program stored in a computer-readable medium, a computer-readable medium storing the computer program, and an apparatus (system) thereof.

According to an embodiment, the present disclosure may be implemented in various methods including a method, an apparatus (system), a computer program stored in a computer-readable medium, or a computer-readable medium in which a computer program is stored.

According to an embodiment, a checkpoint and rewind method in a serverless platform performed by at least one processor includes receiving a function execution request on the serverless platform, storing an initial state of a sandbox by performing a checkpoint operation on the sandbox associated with the function execution request, and restoring a state of the sandbox to the initial state by performing a rewind operation on the sandbox after a task corresponding to the function execution request is completed.

In an embodiment of the present disclosure, the storing of the initial state of the sandbox includes storing an initial state for a memory area of the sandbox.

In an embodiment of the present disclosure, the storing of the initial state for the memory area of the sandbox includes copying a page table entry on an original page table onto a buddy page table.

In an embodiment of the present disclosure, the copying of the page table entry on the original page table onto the buddy page table includes applying a CoW algorithm to the original page table and the buddy page table.

In an embodiment of the present disclosure, the copying of the page table entry on the original page table onto the buddy page table includes changing the first page table entry to a non-writable one and copying the first page table entry onto the buddy page table when a first page table entry on the original page table is writable.

In an embodiment of the present disclosure, the copying of the page table entry on the original page table onto the buddy page table further includes maintaining the first page table entry copied onto the buddy page table when the first page table entry on the original page table is changed.

In an embodiment of the present disclosure, the copying of the page table entry on the original page table onto the buddy page table includes copying a second page table entry associated with the read fault onto the original page table and the buddy page table when a read fault occurs.

In an embodiment of the present disclosure, the copying of the page table entry on the original page table onto the buddy page table includes copying a third page table entry associated with the file-backed page onto the buddy page table so as to reference an original copy when a write fault for a file-backed page occurs.

In an embodiment of the present disclosure, the copying of the page table entry on the original page table onto the buddy page table includes copying a fourth page table entry associated with the anonymous page onto the buddy page table in a writable form when a write fault for an anonymous page occurs.

In an embodiment of the present disclosure, the restoring of the state of the sandbox to the initial state by performing the rewind operation on the sandbox includes maintaining a page table entry of the original page table sharing the page frame number when the original page table and the buddy page table share a page frame number of a page table entry.

In an embodiment of the present disclosure, the restoring of the state of the sandbox to the initial state by performing the rewind operation on the sandbox includes restoring a page table entry of the original page table to a page table entry of the buddy page table when the original page table and the buddy page table do not share a page frame number of a page table entry.

In an embodiment of the present disclosure, the storing of the initial state of the sandbox includes storing an initial state of a file system of the sandbox.

In an embodiment of the present disclosure, the storing of the initial state of the file system of the sandbox includes storing an initial state of an upper file system, where a change is recorded, in the file system including the upper file system and a lower file system.

In an embodiment of the present disclosure, the restoring of the state of the sandbox to the initial state by performing the rewind operation on the sandbox includes changing the first file to a file of the lower file system or the initial state when a file corresponding to a first file in the upper file system is included in the lower file system or the initial state.

In an embodiment of the present disclosure, the restoring of the state of the sandbox to the initial state by performing the rewind operation on the sandbox includes deleting the second file when a file corresponding to a second file in the upper file system is not included in the lower file system or the initial state.

According to an embodiment, a computer program stored in a computer-readable recording medium is provided to execute the above-described method on a computer.

According to an embodiment, a computing apparatus includes a communication module, a memory, and at least one processor connected to the memory and configured to execute at least one computer-readable program included in the memory. The at least one program includes instructions for receiving a function execution request on a serverless platform, storing an initial state of a sandbox by performing a checkpoint operation on the sandbox associated with the function execution request, and restoring a state of the sandbox to the initial state by performing a rewind operation on the sandbox after a task corresponding to the function execution request is completed.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 2 is a diagram illustrating an example in which a checkpoint operation is performed in a memory area of a sandbox, according to an embodiment of the present disclosure;

FIG. 3 is a diagram showing an example in which a function is executed in a memory area of a sandbox, according to an embodiment of the present disclosure;

4

Figure 7:
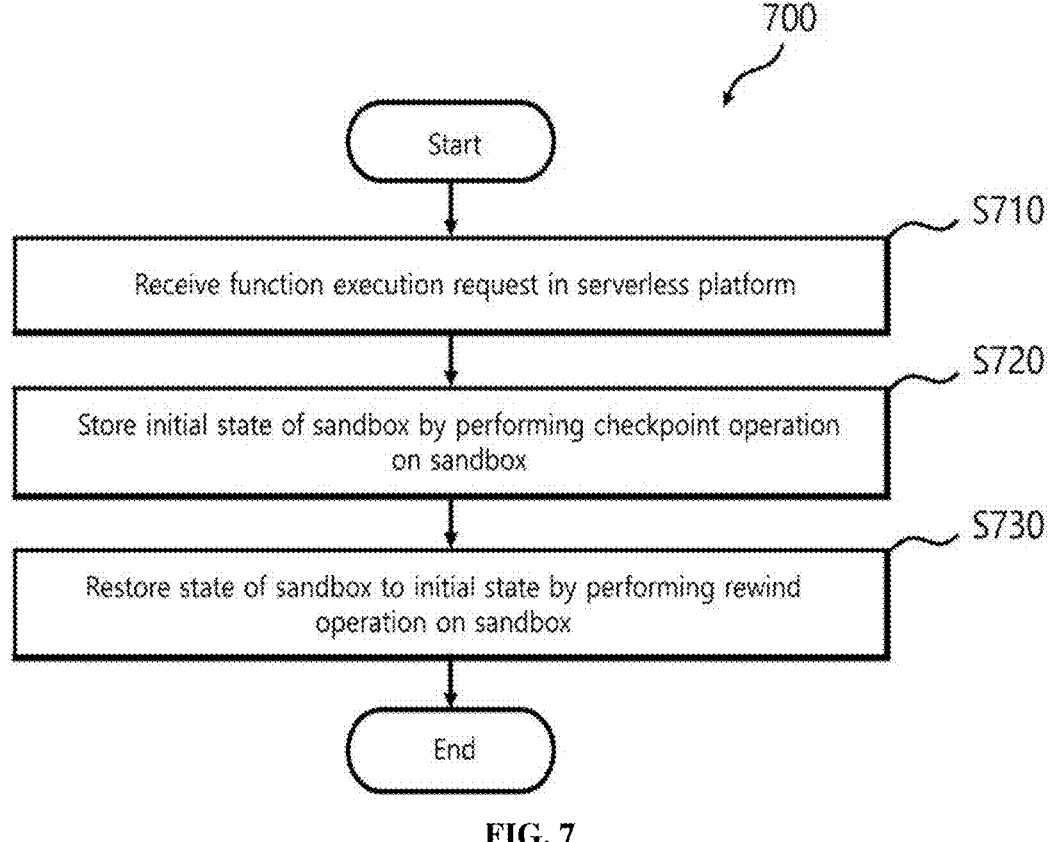
Figure 8:
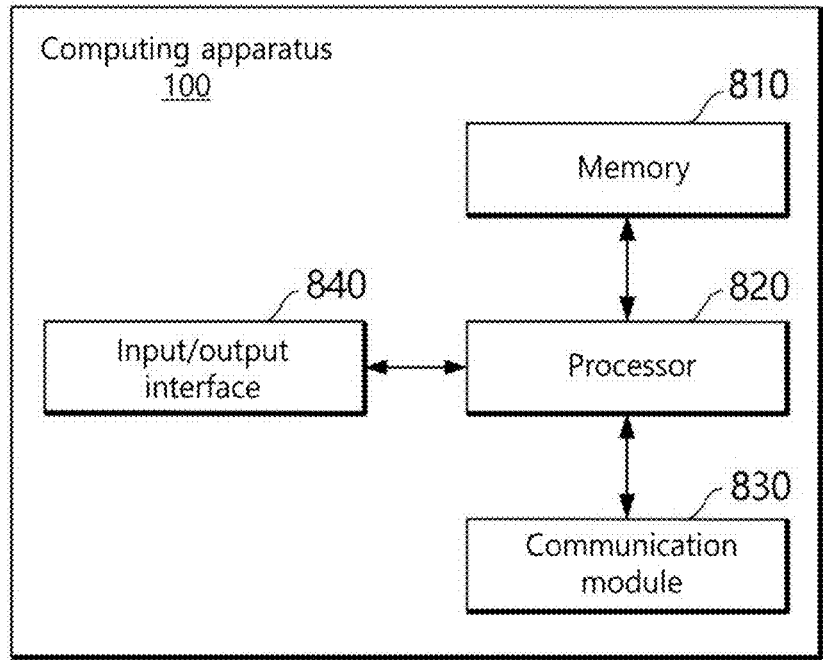

FIG. 7 is a flowchart illustrating an example of a checkpoint and rewind method in a serverless platform, according to an embodiment of the present disclosure; and FIG. 8 is a block diagram showing an internal configuration of a computing apparatus, according to an embodiment of the present disclosure.

DETAILED DESCRIPTION

Hereinafter, details for implementing the present disclosure will be described in detail with reference to the accompanying drawings. However, in the following description, when there is a risk of unnecessarily obscuring the gist of the present disclosure, detailed descriptions of well-known functions or configurations will be omitted.

In the accompanying drawings, identical or corresponding components are assigned the same reference numerals. Moreover, in the description of embodiments below, descriptions of the same or corresponding components may be omitted to avoid redundancy. However, even though descriptions regarding components are omitted, it is not intended that such components are not included in any embodiment.

The above and other aspects, features and advantages of the present disclosure will become apparent from embodiments to be described in conjunction with the accompanying drawings. However, the present disclosure may be embodied in various different forms, and should not be construed as being limited only to the illustrated embodiments. Rather, these embodiments are provided as examples such that the present disclosure will be thorough and complete, and will fully convey the scope of the present disclosure to those skilled in the art.

Terms used in this specification will be briefly described, and the disclosed embodiments will be described in detail. Although certain general terms widely used in this specification are selected to describe embodiments in consideration of the functions of the present disclosure, these general terms may vary according to intentions of one of ordinary skill in the art, case precedents, the advent of new technologies, and the like. Terms arbitrarily selected by the applicant of the embodiments may also be used in a specific case. In this case, their meanings are given in the detailed description of the present disclosure. Hence, these terms used in the present disclosure may be defined based on their meanings and the contents of the present disclosure, not by simply stating the terms.

In this specification, singular expressions include expressions in the plural unless the context clearly specifies that they are singular. The expressions in the plural include expressions in the singular unless the context clearly dictates that the expression is plural. It will be understood that the terms "comprises," "comprising," "includes" and/or "including," when used herein, specify the presence of stated elements and/or components, but do not preclude the presence or addition of one or more other elements and/or components.

In the present disclosure, the terms "comprise," "comprising," and the like may indicate that there are features, steps, operations, elements, and/or components, but such terms do not exclude the addition of one or more other features, steps, operations, elements, components, and/or combinations thereof.

In the present disclosure, when a specific component is referred to as being "coupled," "combined," "connected," or "reacting" with any other component, the specific component may be, but is not limited to, directly coupled, combined, and/or connected to, or reacting with, another component. For example, there may be one or more intermediate components between the specific component and another component. Moreover, in the present disclosure, "and/or" may include each of one or more of the listed entries or a combination of at least part of one or more of the listed entries.

In the present disclosure, terms such as "first," "second," etc. are used to distinguish a specific component from another component, and the above-described components are not limited by these terms. For example, the "first" component may be an element of a form identical or similar to a form of the "second" component.

In the present disclosure, serverless computing may refer to a form of a service where peripheral application software functions required to run core functions are provided by a cloud service provider.

In the present disclosure, a "sandbox" may refer to a software unit having components and functions necessary to execute an application, and may include, for example, a container.

In the present disclosure, a "checkpoint" may refer to an operation of storing an initial state of the sandbox, and a "rewind" may refer to an operation of restoring an initial state of the sandbox stored by the checkpoint.

Figure 1:
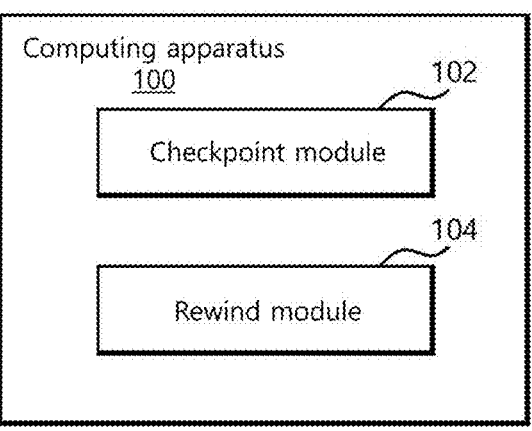
FIG. 1 is a block diagram showing a functional configuration of a computing apparatus, according to an embodiment of the present disclosure.

FIG. 1 is a block diagram showing a functional configuration of a computing apparatus 100, according to an embodiment of the present disclosure. According to an embodiment, the computing apparatus 100 may refer to any apparatus for providing and managing a serverless computing service. For example, when receiving an execution request of a function associated with an application from a user, the computing apparatus 100 may execute the requested function in a sandbox such as a container. In this case, the computing apparatus 100 may remove data residues according to the execution of the function from the sandbox by using a checkpoint module 102 and a rewind module 104.

In an embodiment, when the function is executed in the sandbox, privacy-sensitive data may remain within the sandbox. To remove the data residues remaining in the sandbox and to maintain isolation between function requests, the computing apparatus 100 may use the checkpoint module 102 and the rewind module 104. For example, the computing apparatus 100 may store an initial state of the sandbox before the function is executed, by using the checkpoint module 102 and may change the state of the sandbox to the initial state by using the rewind module 104 when the function is completely executed.

In an embodiment, a code for a checkpoint operation and a rewind operation may be included in the process of the sandbox. For example, the sandbox may include a proxy process and a launcher process. Here, the proxy process may be used to deliver requests for and responses to the launcher process, and the launcher process may be used to load the function into the sandbox, or to receive a function factor and to execute the function code.

In an embodiment, when a checkpoint operation is performed by the checkpoint module 102, information about the initial state of the launcher process may be obtained. Because privacy-sensitive data may enter the sandbox when the launcher process receives the factor of a function and executes the function, the code for the checkpoint operation may be included in the proxy process.

In an embodiment, when the rewind operation is performed by the rewind module 104, the launcher process may be restored to the initial state obtained by the checkpoint module 102. For example, the code for the rewind operation may be located in the proxy process and may be executed after the execution result of the function is returned from the launcher process. As a result, data recorded while a function request is processed may be removed, and the sandbox may be changed to its initial state.

In an embodiment, while the function is being executed in the sandbox, privacy-sensitive data may be stored on a memory or stored in a temporary file system. Moreover, a background task may be processed to process the privacy-sensitive data. To store the initial state of the sandbox and restore the initial state stored after the function is executed, the computing apparatus 100 may perform checkpoint and rewind operations on the memory, the file system, and tasks.

In FIG. 1, each functional configuration included in the computing apparatus 100 is separately described. However, this is only to help understanding the present disclosure, two or more functions may be performed in one computing apparatus. With this configuration, the computing apparatus 100 may simply remove privacy-sensitive data included in a sandbox by using a checkpoint operation and a rewind operation, and may improve the execution speed of a function by utilizing the trace of a previous function while temporary isolation between function requests is ensured.

FIG. 2 is a diagram illustrating an example in which a checkpoint operation is performed in a memory area of a sandbox, according to an embodiment of the present disclosure. In an embodiment, a memory area of a sandbox for performing a checkpoint operation may consist of an original page table 212 and a buddy page table 214. In the illustrated example, a first table 210 may indicate a memory area of an initial state, and a second table 220 may indicate a memory area after the checkpoint operation is performed.

In an embodiment, the original page table 212 may indicate the virtual memory area of the original page, and the buddy page table 214 may indicate a virtual memory area for copying and storing the initial state of the original page table 212 and related information. The original page table 212 and the buddy page table 214 may be managed by software. For example, each of the original page table 212 and the buddy page table 214 may consist of 4 KB, but are not limited thereto.

Referring to the first table 210, the original page table 212 may include five memory areas, two of which are filled with page table entries (PTE). Furthermore, referring to the second table 220, the memory area of the original page table 212 may be copied onto the buddy page table 214 through the checkpoint operation. That is, after the checkpoint operation, the second table 220 may include two page table entries.

In an embodiment, the original page table 212 and the buddy page table 214 may operate by a copy-on-write (CoW) algorithm. Here, CoW and/or the CoW algorithm may refer to a method of allocating another memory area, in which a value stored in the corresponding memory area is changed, after the original page table 212 and the buddy page table 214 reference the same memory area to efficiently manage memory resources.

In the illustrated example, when the first page table entry 222 on the original page table 212 is writable (i.e., Writable: 1), the first page table entry 222 may be changed to be non-writable (i.e., Writable: 0) by the CoW and may be copied onto the buddy page table 214. Afterward, when the value of the first page table entry 222 of the original page table 212 is newly written or changed, a page frame number PFN referenced in the original page table 212 may be changed, and the first page table entry 222 copied onto the buddy page table 214 may be maintained in its initial state.

With this configuration, even when privacy-sensitive data is written on the original page table 212, the page frame number referenced in the buddy page table 214 may be maintained, and thus information of the initial state of a memory area that does not include the privacy-sensitive data during a rewind operation may be returned.

FIG. 3 is a diagram showing an example in which a function is executed in a memory area of a sandbox, according to an embodiment of the present disclosure. In the illustrated example, the second table 220 may indicate a memory area after a checkpoint operation is performed, and a third table 310 may indicate a memory area after a function is completely executed.

In an embodiment, for unfilled areas (i.e., 3 out of 5 memory areas), in which page faults occur in the original page table 212 and the buddy page table 214, the checkpoint operation may be performed when the corresponding memory area is filled. That is, a point in time when the checkpoint operation is performed may be determined differently depending on a point in time when a page is filled in the original page table 212.

Referring to the third table 310, when a read fault occurs, a second page table entry 316 associated with the read fault may be copied onto the original page table 212 and the buddy page table 214. That is, when the page fault is a read fault, the second page table entry 316 stored in the original page table 212 and the buddy page table 214 may have a 'Writable' value of '0' and may reference the same page frame number.

In an embodiment, when a write fault for a file-backed page occurs, a third page table entry 314 for the file-backed page may be copied onto the buddy page table 214 to reference the original copy of a page. In this case, the third page table entry 314 may reference a private copy in the original page table 212. That is, the third page table entry 314 stored in the original page table 212 and the buddy page table 214 may have different 'Writable' values of '0' and '1', respectively, and may reference different page frame numbers.

In an embodiment, when a write fault for an anonymous page occurs, a fourth page table entry 312 associated with the anonymous page may be copied onto the buddy page table 214 in a writable form. For example, the anonymous page may have an initial form filled with the value of '0', and thus an initial state may be tracked even when the 'Writable' value is '1'. That is, the fourth page table entry 312 stored in the original page table 212 and the buddy page table 214 may have a 'Writable' value of '1' despite the protection of the CoW, and may reference the same page frame number.

Figure 4:
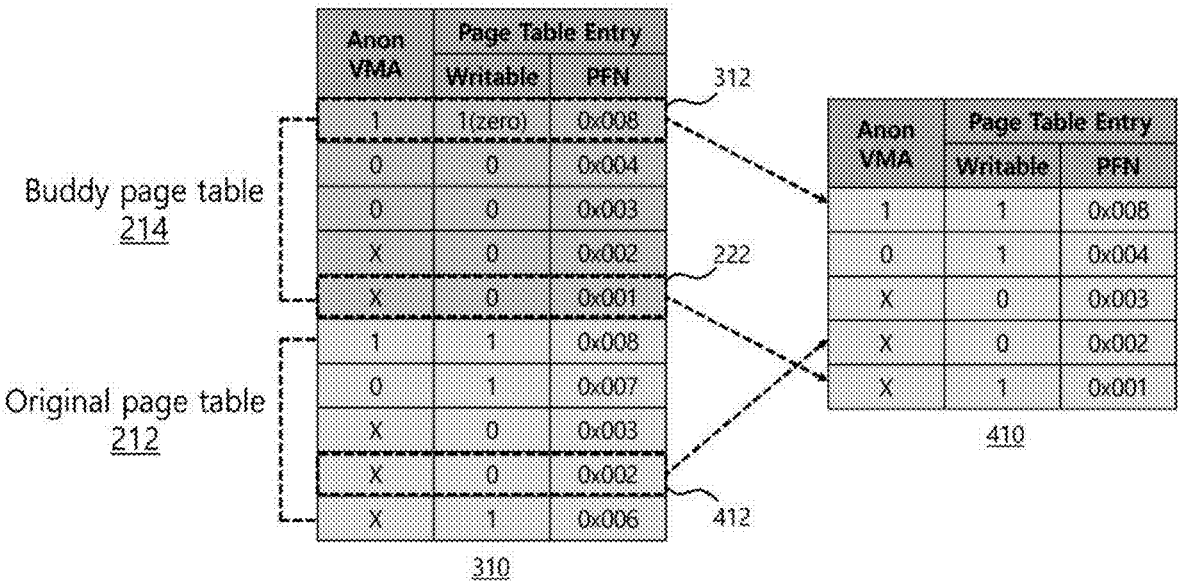
FIG. 4 is a diagram illustrating an example, in which a rewind operation is performed in a memory area of a sandbox, according to an embodiment of the present disclosure.

FIG. 4 is a diagram illustrating an example, in which a rewind operation is performed in a memory area of a sandbox, according to an embodiment of the present disclosure. In the illustrated example, the third table 310 may indicate a memory area after a function is completely executed, and a fourth table 410 may indicate a memory area after a rewind operation is performed. The rewind operation may be performed by being divided into i) a case where the original page table 212 and the buddy page table 214 reference a read-only page, and ii) a case where the original page table 212 and the buddy page table 214 reference a writable page, and may be identified as a case where a file-backed page and an anonymous page are referenced in the case of the writable page.

In an embodiment, a fifth page table entry 412 may have a 'Writable' value of '0' in both the original page table 212 and the buddy page table 214, and may reference the same page frame number '0x002'. In this way, when the original page table 212 and the buddy page table 214 share a page frame number, the corresponding page table entry on the original page table 212 may be determined to be maintained in an initial state. That is, the fifth page table entry 412 may be maintained as an entry of the original page table 212 indicating the initial state.

In an embodiment, in the first page table entry 222, a page frame number of '0x006' referenced in the original page table 212 and a page frame number of '0x001' referenced in the buddy page table 214 may be determined differently by writing a new value after the checkpoint operation is performed. In this way, when the original page table 212 and the buddy page table 214 do not share a page frame number, the page table entry of the original page table 212 may be restored to the page table entry of the buddy page table 214. That is, the first page table entry 222 may be restored to the entry of the buddy page table 214 indicating an initial state.

In an embodiment, the fourth page table entry 312 may be an entry associated with an anonymous page. As described above, the fourth page table entry 312 associated with the anonymous page may have a 'Writable' value of '1' in both the original page table 212 and the buddy page table 214, and may reference the same page frame number '0x008'. In this way, when the original page table 212 and the buddy page table 214 share a page frame number, the corresponding page table entry on the original page table 212 may be determined to be maintained in an initial state. That is, the fourth page table entry 312 may be maintained as an entry of the original page table 212.

Through the process described above in FIGS. 2 to 4, the computing apparatus may store the initial state of the memory area of the sandbox by using the virtual buddy page table 214 and the CoW algorithm, and may restore the initial state of the memory area based on the page table entry included in the original page table 212 and the buddy page table 214. With this configuration, the computing apparatus may perform a checkpoint operation and a rewind operation in the memory area depending on each case, thereby removing data residues in the memory area and preventing privacy-sensitive data from being exploited when the next function is executed.

Figure 5:
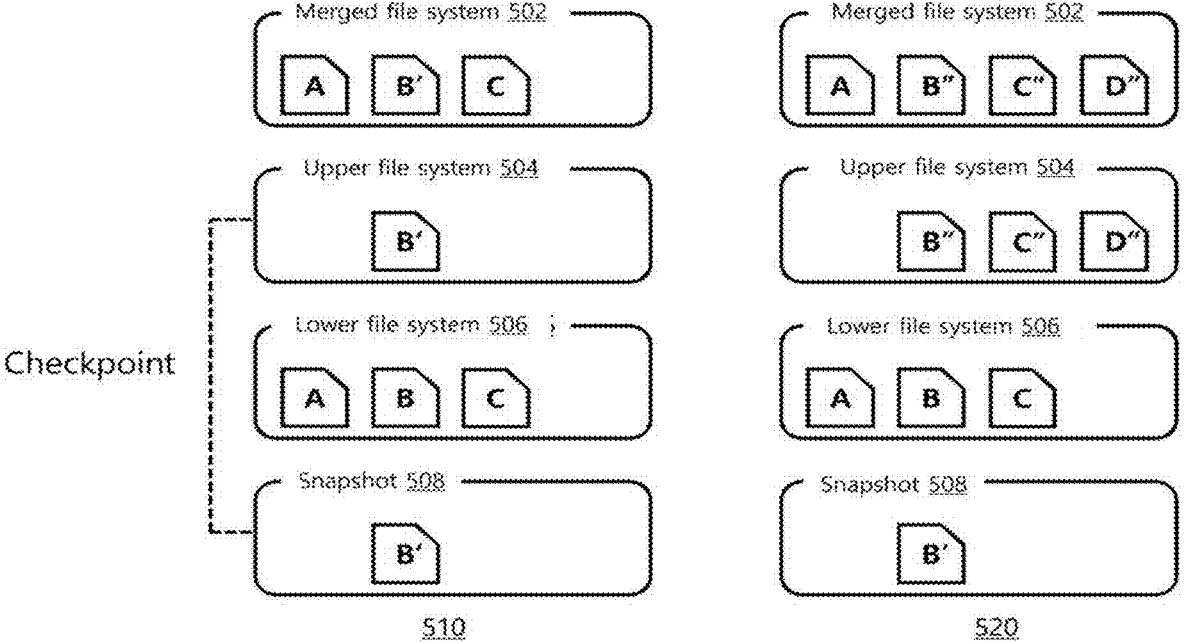
FIG. 5 is a diagram showing an example, in which a checkpoint operation and function execution are performed in a file system of a sandbox, according to an embodiment of the present disclosure.

FIG. 5 is a diagram showing an example, in which a checkpoint operation and function execution are performed in a file system of a sandbox, according to an embodiment of the present disclosure. In an embodiment, the file system of the sandbox may consist of a merged file system 502, an upper file system 504, and a lower file system 506. Here, the lower file system 506 may include a reference file, and the upper file system 504 may be obtained by recording content modified during runtime. The file system of the sandbox may be in a form composed of the merged file system 502 obtained by merging the upper file system 504 and the lower file system 506, and may include, for example, OverlayFS.

In an embodiment, a first file system 510 may indicate a file system of an initial state. In the first file system 510, the lower file system 506 may be immutable, and the upper file system 504 may be volatile. That is, storing the initial state of the first file system 510 may be sufficient to copy and store the files in the upper file system 504. That is, when a checkpoint operation is performed on the first file system 510, the initial state of the upper file system 504, in which changes are recorded, may be copied and stored in a snapshot 508, which is a temporary storage space, by the checkpoint operation.

In an embodiment, a second file system 520 may indicate a file system after a function is completely executed. As shown in drawings, when the function is executed and a file is modified or created, the content of the modified or created file may be written to the upper file system 504. For example, file B″ is created when a modification to file B′ occurs, file C″ is created when a modification to file C occurs, and a new file D″ may be created and written to the upper file system 504.

Figure 6:
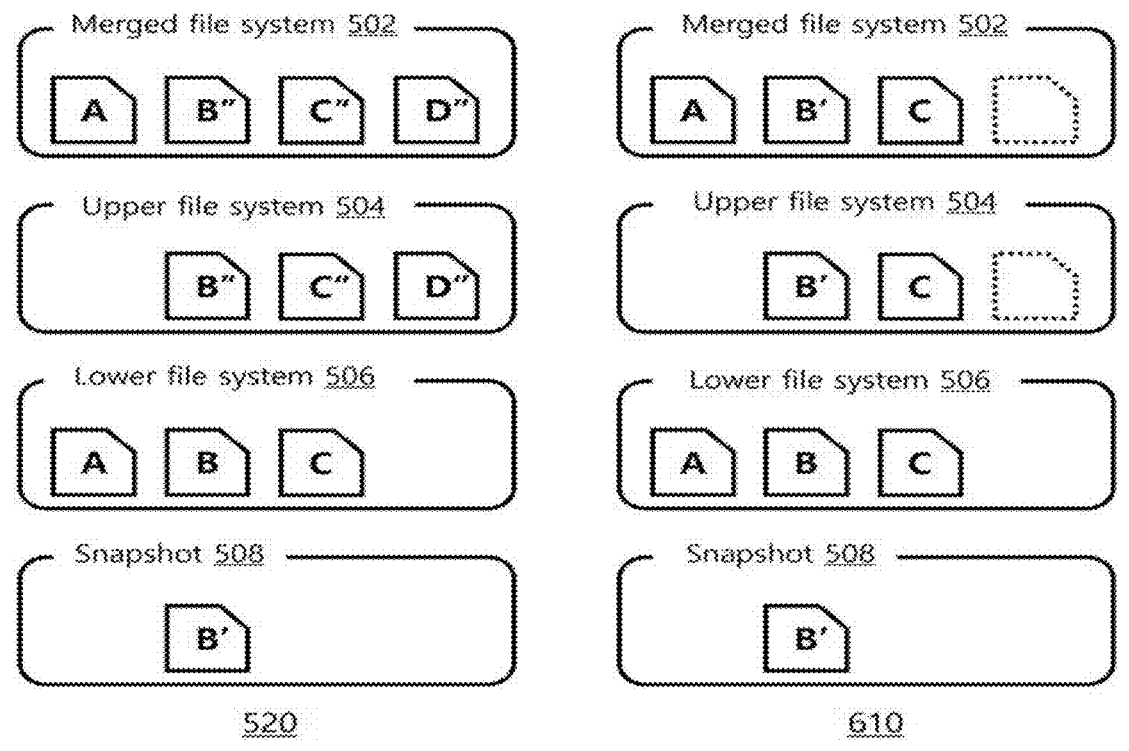
FIG. 6 is a diagram illustrating an example in which a rewind operation is performed in a file system of a sandbox, according to an embodiment of the present disclosure.

FIG. 6 is a diagram illustrating an example in which a rewind operation is performed in a file system of a sandbox, according to an embodiment of the present disclosure. In the illustrated example, the second file system 520 may indicate a file system after a function is completely executed, and a third file system 610 may indicate a file system after a rewind operation is performed.

In an embodiment, when a file corresponding to a specific file included in the upper file system 504 is included in the lower file system 506 or the snapshot 508, the corresponding file may be changed to a file of the lower file system 506 or the snapshot 508. Here, the snapshot 508 may indicate a virtual temporary storage space. For example, when a file corresponding to a specific file is included in both the lower file system 506 and the snapshot 508, the corresponding file may be restored as the file of the snapshot 508. When a file corresponding to a specific file is included in only the lower file system 506, the corresponding file may be restored as the file of the lower file system 506.

In the example shown, a file corresponding to file B″ may be included in the lower file system 506 and the snapshot 508. In this case, file B″ may be restored based on the snapshot 508 and may be converted to file B′. Moreover, a file corresponding to file C″ may only be included in the lower file system 506. In this case, file C″ may be restored based on the lower file system 506 and may be converted to file C.

In an embodiment, when a file corresponding to a specific file included in the upper file system 504 is not included in both the lower file system 506 and the snapshot 508, the corresponding file may be deleted. In the example shown, a file corresponding to file D″ may not be included in both the lower file system 506 and the snapshot 508. In this case, file D″ may be deleted. In this way, when the restoration is completed with respect to each file included in the upper file system 504, the merged file system 502 may be restored to an initial state.

FIGS. 2 to 4 show examples in which a checkpoint and a rewind are performed in a memory area, and FIGS. 5 to 6 show examples in which the checkpoint and the rewind are performed in a file system, but are not limited thereto. For example, the checkpoint and the rewind may be performed similarly to the process described above on a task in a sandbox. With this configuration, a computing apparatus may store and utilize the initial state of the sandbox in a memory area, a file system, and a task, thereby improving the processing speed by utilizing the traces of the previous function execution to optimize the execution of the subsequent function while maintaining temporary isolation from the next function.

FIG. 7 is a flowchart illustrating an example of a checkpoint and rewind method 700 in a serverless platform, according to an embodiment of the present disclosure. The checkpoint and rewind method 700 in a serverless platform may be performed by a processor (e.g., at least one processor of a computing apparatus). The checkpoint and rewind method 700 in a serverless platform may be initiated as the processor receives a function execution request in the serverless platform (S710). For example, when there is an execution request for an application from a user employing serverless computing, a function execution request related to the corresponding application may be received.

In an embodiment, the processor may store the initial state of a sandbox by performing a checkpoint operation on the sandbox associated with the function execution request (S720). For example, the processor may store initial states of a memory area, a file system, and a task of the sandbox. A checkpoint for a memory area may be performed by copying a page table entry in an original page table to a buddy page table. In this case, the CoW algorithm may be applied to the original page table and the buddy page table.

In an embodiment, when a first page table entry on the original page table is writable, the processor may change the first page table entry to a non-writable one by using CoW protection and may copy the first page table entry onto the buddy page table. Then, when the first page table entry on the original page table is changed, the processor may maintain the first page table entry copied onto the buddy page table and may change a value of the original page table.

In an embodiment, the processor may perform a checkpoint operation by processing a page fault in the memory area. For example, when a read fault occurs, the processor may copy a second page table entry associated with the read fault onto the original page table and the buddy page table. In another example, when a write fault for a file-backed page occurs, the processor may copy a third page table entry associated with the file-backed page onto the buddy page table to reference an original copy. In another example, when a write fault for an anonymous page occurs, the processor may copy a fourth page table entry associated with the anonymous page onto the buddy page table in a writable form.

In an embodiment, the processor may store the initial state of an upper file system, where a change is recorded, in a file system including the upper file system and a lower file system. For example, the file system may include a merged file system obtained by merging the upper file system and the lower file system, and the processor may simply store the initial state of the file system by storing only the initial state of the upper file system without the need to store the initial state of the lower file system, which is immutable.

In an embodiment, after a task corresponding to the function execution request is completed, the processor may restore the state of the sandbox to the initial state by performing a rewind operation on the sandbox (S730). For example, when the original page table and the buddy page table share the page frame number of the page table entry in the memory area, the processor may maintain a page table entry of the original page table sharing the page frame number. Moreover, when the original page table and the buddy page table do not share the page frame number of the page table entry, the processor may restore the page table entry of the original page table to the page table entry of the buddy page table.

Additionally, when a file corresponding to a first file in the upper file system in a file system is included in the lower file system or an initial state, the processor may change the first file to a file of the lower file system or the initial state. Furthermore, when a file corresponding to a second file in the upper file system is not included in the lower file system or an initial state, the processor may delete the second file.

FIG. 8 is a block diagram showing an internal configuration of the computing apparatus 100, according to an embodiment of the present disclosure. The computing apparatus 100 may include a memory 810, a processor 820, a communication module 830, and an input/output interface 840. As shown in FIG. 8, the computing apparatus 100 may be configured to exchange information and/or data over a network by using the communication module 830.

The memory 810 may include any computer-readable recording medium. According to an embodiment, the memory 810 may include a permanent mass storage device such as a random access memory (RAM), a read only memory (ROM), a disk drive, a solid state drive (SSD), a flash memory, or the like. For another example, the permanent mass storage device such as a ROM, a SSD, a flash memory, or a disk drive may be included in the computing apparatus 100 as a permanent storage device separate from the memory. Moreover, an operating system and at least one program code may be stored in the memory 810.

These software components may be loaded from a computer-readable recording medium independent of the memory 810. Such the separate computer-readable recording medium may include a recording medium capable of being directly connected to the computing apparatus 100, and may include, for example, a computer-readable recording medium such as a floppy drive, a disk, a tape, a DVD/CD-ROM drive, and a memory card. For another example, the software components may be loaded into the memory 810 through the communication module 830, not the computer-readable recording medium. For example, at least one program may be loaded into the memory 810 based on a computer program installed by files provided by developers or a file distribution system, which distributes a file for installing an application, through the communication module 830.

The processor 820 may be configured to process instructions of a computer program by performing basic arithmetic, logic, and input and output operations. The instructions may be provided to another user terminal (not shown) or another external system by the memory 810 or the communication module 830.

The communication module 830 may provide a configuration or function that allows a user terminal (not shown) and the computing apparatus 100 to communicate with each other over the network. The computing apparatus 100 may provide a configuration or function for communicating with an external system (e.g., a separate cloud system, etc.). For example, control signals, commands, data, or the like provided under the control of the processor 820 of the computing apparatus 100 may be transmitted to a user terminal and/or the external system through the communication module of the user terminal and/or the external system via the communication module 830 and a network.

Moreover, the input/output interface 840 of the computing apparatus 100 may be a means for interfacing with an apparatus (not shown) for an input or an output, which is connected to the computing apparatus 100 or is included in the computing apparatus 100. In FIG. 8, the input/output interface 840 is shown as an element configured separately from the processor 820, but is not limited thereto. For example, the input/output interface 840 may be configured to be included in the processor 820. The computing apparatus 100 may include more components than those of FIG. 8. However, there is no need to clearly illustrate most conventional components.

The processor 820 of the computing apparatus 100 may be configured to manage, process, and/or store information and/or data received from a plurality of user terminals and/or a plurality of external systems.

The above-described method and/or various embodiments may be implemented by digital electronic circuits, computer hardware, firmware, software, and/or a combination thereof. Various embodiments of the present disclosure may be implemented as a data processing apparatus, for example, one or more programmable processors and/or one or more computing apparatuses, or as a computer-readable recording medium and/or a computer program stored on the computer-readable recording medium. The computer program described above may be written in any programming language, including a compiled or interpreted language, and may be distributed in any form, such as a standalone program, module, subroutine, or the like. The computer program may be distributed through a single computing apparatus, a plurality of computing apparatus s connected through the same network, and/or a plurality of computing apparatus s distributed to be connected through a plurality of different networks.

The above-described method and/or various embodiments may be performed by one or more processors configured to execute one or more computer programs that process, store and/or manage any function, function, or the like by operating based on input data or generating output data. For example, the method and/or various embodiments of the present disclosure may be performed by special purpose logic circuits such as a field programmable gate array (FPGA) or an application specific integrated circuit (ASIC), and an apparatus and/or a system for performing the method and/or embodiments of the present disclosure may be implemented as a special purpose logic circuit such as an FPGA or an ASIC.

The one or more processors executing the computer program may include a general purpose or special purpose microprocessor and/or one or more processors of any type of a digital computing apparatus. The processor may receive instructions and/or data from each of a read-only memory and a random access memory or may receive instructions and/or data from both the read-only memory and the random access memory. In the present disclosure, components of the computing apparatus performing the method and/or embodiments may include one or more processors for executing instructions, and one or more memory apparatus s for storing the instructions and/or the data.

According to an embodiment, the computing apparatus may exchange data with one or more mass storage apparatus s for storing data. For example, the computing apparatus may receive data from a magnetic disk or an optical disc, and/or may transmit data to the magnetic disk or the optical disc. A computer-readable storage medium suitable for storing instructions and/or data associated with a computer program may include any form of a non-volatile memory including, but not limited to, a semiconductor memory apparatus such as an erasable programmable read-only memory (EPROM), an electrically erasable PROM (EE-PROM), and a flash memory apparatus. For example, the computer-readable storage medium may include a magnetic disk (e.g., an internal hard disk or a removable disk), a magneto-optical disc, a CD-ROM disc, and a DVD-ROM disc.

To provide interaction with a user, the computing apparatus may include, but is not limited to, a display apparatus (e.g., a cathode ray tube (CRT), a liquid crystal display (LCD), or the like) for providing or displaying information to a user and a pointing apparatus for allowing the user to provide inputs and/or commands to the computing apparatus. In other words, the computing apparatus may further include any other types of apparatus s for providing interaction with the user. For example, to interact with the user, the computing apparatus may provide the user with any form of sensory feedback including visual feedback, auditory feedback, and/or tactile feedback. In this regard, the user may provide an input to the computing apparatus through various gestures such as vision, speech, and movement.

In the present disclosure, various embodiments may be implemented in the computing system including a backend component (e.g., a data server), a middleware component (e.g., an application server) and/or a front-end component. In this case, the components may be interconnected by a medium or any form of digital data communication such as a communications network. For example, the communication network may include a local area network (LAN), a wide area network (WAN), or the like.

The computing apparatus based on embodiments described in this specification may be implemented by using hardware and/or software configured to interact with the user by including a user apparatus, a user interface (UI) apparatus, a user terminal, or a client apparatus. For example, the computing apparatus may include a portable computing apparatus such as a laptop computer. Additionally or alternatively, the computing apparatus may include, but is not limited to, personal digital assistants (PDA), a tablet PC, a game console, a wearable apparatus, an Internet of things (IoT) apparatus, a virtual reality (VR) apparatus, an augmented reality (AR) apparatus, and the like. The computing apparatus may further include other types of apparatuses configured to interact with the user. Besides, the computing apparatus may include a portable communication apparatus (e.g., a mobile phone, a smart phone, a wireless cellular phone, or the like) suitable for wireless communication over a network such as a mobile communication network. The computing apparatus may be configured to wirelessly communicate with a network server by using protocols and/or wireless communication technologies, such as a radio frequency (RF), a microwave frequency (MWF), and/or an infrared ray frequency (IRF).

In various embodiments of the present disclosure, a computing apparatus may simply remove privacy-sensitive data included in a sandbox by using a checkpoint operation and a rewind operation, and may improve the execution speed of a function by utilizing the trace of a previous function while temporary isolation between function requests is ensured.

In various embodiments of the present disclosure, even when privacy-sensitive data is written on an original page table, the page frame number referenced in a buddy page table may be maintained, and thus information of the initial state of a memory area that does not include the privacy-sensitive data during a rewind operation may be returned.

In the present disclosure, various embodiments including specific structural and functional details are illustrative. Accordingly, embodiments of the present disclosure are not limited to those described above and may be implemented in various other forms. Moreover, the terminology used in the present disclosure is for the purpose of describing some embodiments and is not to be construed as limiting an embodiment. For example, unless the context clearly indicates otherwise, "words in the singular" and "the/said" may be construed to include the plural.

In the present disclosure, unless otherwise defined, all terms used in this specification, including technical or scientific terms, have the same meaning as commonly understood by a person of ordinary skill in the art to which such concepts belong. Furthermore, commonly used terms, such as dictionary-defined terms, should be interpreted to have a meaning consistent with their meaning in the context of the relevant art.

Although the present disclosure has been described herein in connection with some embodiments, it should be understood that various modifications and changes may be made without departing from the scope of the present disclosure as understood by those skilled in the art to which the present disclosure pertains. Moreover, such modifications and variations are intended to fall within the scope of claims appended hereto.

What is claimed is:

1. A checkpoint and rewind method in a serverless platform performed by at least one processor, the method comprising:
 receiving a function execution request on the serverless platform;
 storing an initial state of a sandbox by performing a checkpoint operation on the sandbox associated with the function execution request; and
 after a task corresponding to the function execution request is completed, restoring a state of the sandbox to the initial state by performing a rewind operation on the sandbox,
 wherein the storing of the initial state for the memory area of the sandbox includes copying a page table entry (PTE) on an original page table onto a buddy page table, and
 wherein the copying of the page table entry on the original page table onto the buddy page table includes, when a first page table entry on the original page table is writable, changing the first page table entry to a nonwritable one and copying the first page table entry onto the buddy page table.

2. The method of claim 1, wherein the storing of the initial state of the sandbox includes:
 storing an initial state for a memory area of the sandbox.

3. The method of claim 1, wherein the copying of the page table entry on the original page table onto the buddy page table includes:
 applying a copy-on-write (CoW) algorithm to the original page table and the buddy page table.

4. The method of claim 1, wherein the copying of the page table entry on the original page table onto the buddy page table further includes:
 when the first page table entry on the original page table is changed, maintaining the first page table entry copied onto the buddy page table.

5. The method of claim 1, wherein the copying of the page table entry on the original page table onto the buddy page table includes:
 when a read fault occurs, copying a second page table entry associated with the read fault onto the original page table and the buddy page table.

6. The method of claim 1, wherein the copying of the page table entry on the original page table onto the buddy page table includes:
 when a write fault for a file-backed page occurs, copying a third page table entry associated with the file-backed page onto the buddy page table so as to reference an original copy.

7. The method of claim 1, wherein the copying of the page table entry on the original page table onto the buddy page table includes:

when a write fault for an anonymous page occurs, copying a fourth page table entry associated with the anonymous page onto the buddy page table in a writable form.

8. The method of claim 1, wherein the restoring of the state of the sandbox to the initial state by performing the rewind operation on the sandbox includes:

when the original page table and the buddy page table share a page frame number (PFN) of a page table entry, maintaining a page table entry of the original page table sharing the page frame number.

9. The method of claim 1, wherein the restoring of the state of the sandbox to the initial state by performing the rewind operation on the sandbox includes:

when the original page table and the buddy page table do not share a page frame number of a page table entry, restoring a page table entry of the original page table to a page table entry of the buddy page table.

10. The method of claim 1, wherein the storing of the initial state of the sandbox includes:

storing an initial state of a file system of the sandbox.

11. The method of claim 10, wherein the storing of the initial state of the file system of the sandbox includes:

storing an initial state of an upper file system, where a change is recorded, in the file system including the upper file system and a lower file system.

12. The method of claim 11, wherein the restoring of the state of the sandbox to the initial state by performing the rewind operation on the sandbox includes:

when a file corresponding to a first file in the upper file system is included in the lower file system or the initial state, changing the first file to a file of the lower file system or the initial state.

13. A non-transitory computer-readable recording medium storing a program for executing the checkpoint and rewind method in the serverless platform described in claim 1.

14. A checkpoint and rewind method in a serverless platform performed by at least one processor, the method comprising:

receiving a function execution request on the serverless platform;

storing an initial state of a sandbox by performing a checkpoint operation on the sandbox associated with the function execution request; and after a task corresponding to the function execution request is completed, restoring a state of the sandbox to the initial state by performing a rewind operation on the sandbox, wherein the storing of the initial state of the sandbox includes storing an initial state of a file system of the sandbox, wherein the storing of the initial state of the file system of the sandbox includes storing an initial state of an upper file system, where a change is recorded, in the file system including the upper file system and a lower file system, and wherein the restoring of the state of the sandbox to the initial state by performing the rewind operation on the sandbox includes:

when a file corresponding to a second file in the upper file system is not included in the lower file system or the initial state, deleting the second file.

15. A computing apparatus comprising:

a communication module;

a memory; and at least one processor connected to the memory and configured to execute at least one computer-readable program included in the memory;

wherein the at least one program includes instructions for:

receiving a function execution request on a serverless platform;

storing an initial state of a sandbox by performing a checkpoint operation on the sandbox associated with the function execution request; and after a task corresponding to the function execution request is completed, restoring a state of the sandbox to the initial state by performing a rewind operation on the sandbox, wherein the storing of the initial state for the memory area of the sandbox includes copying a page table entry (PTE) on an original page table onto a buddy page table, and wherein the copying of the page table entry on the original page table onto the buddy page table further includes, when the first page table entry on the original page table is changed, maintaining the first page table entry copied onto the buddy page table.

* * * * *